United States Patent
Göczey et al.

(10) Patent No.: US 7,543,834 B2
(45) Date of Patent: Jun. 9, 2009

(54) FOOT-PROPELLED WHEELED HOBBY OR SPORT DEVICE

(75) Inventors: András Göczey, Budapest (HU); Kinga Göczey, Budapest (HU); Luca Göczey, Budapest (HU); Péter Göczey, Budapest (HU); Réka Göczey, Budapest (HU); Soma Ungár, Budapest (HU)

(73) Assignee: M W Innovators Limited, Douglas (IM)

( * ) Notice: Subject to any disclaimer, the term of this patent is extended or adjusted under 35 U.S.C. 154(b) by 146 days.

(21) Appl. No.: 10/518,863

(22) PCT Filed: Jun. 18, 2003

(86) PCT No.: PCT/HU03/00043

§ 371 (c)(1),
(2), (4) Date: Aug. 22, 2005

(87) PCT Pub. No.: WO04/000635

PCT Pub. Date: Dec. 31, 2003

(65) Prior Publication Data

US 2006/0038372 A1    Feb. 23, 2006

(30) Foreign Application Priority Data

Jun. 20, 2002  (HU) ................................. 0202038
Jun. 2, 2003   (HU) ................................. 0303528

(51) Int. Cl.
     *B62K 1/00*     (2006.01)

(52) U.S. Cl. ........................ 280/205; 280/47.3
(58) Field of Classification Search ............. 280/205, 280/47.3
See application file for complete search history.

(56) References Cited

U.S. PATENT DOCUMENTS

| 1,585,258 | A | * | 5/1926  | Moore ..................... 280/205 |
| 1,652,934 | A | * | 12/1927 | Gillespie .................. 280/205 |
| 2,825,575 | A | * | 3/1958  | Mickels ................... 280/87.042 |
| 2,971,773 | A | * | 2/1961  | McKissick ................ 280/205 |
| 5,320,372 | A | * | 6/1994  | Langen .................... 280/207 |

FOREIGN PATENT DOCUMENTS

FR           580855       *    4/1924

* cited by examiner

*Primary Examiner*—Kevin Hurley
(74) *Attorney, Agent, or Firm*—Blakely, Sokoloff, Taylor & Zafman (57) ABSTRACT

The invention relates to a foot-propelled, wheeled hobby and/or sport device that has a foot plate. Characteristic of the device is that it has one or two wheels (1) positioned between two side plates (7, 8) the axle (3) of which wheel (1) is fixed to the side plates (7, 8). Positioned under the wheel (1) axle (3) there are foot plates (9, 10) extending outwards connected to the side plates (7, 8). During the normal use of the device the side plates (7, 8) extend above the knee (21) of the person using the device, who is standing on either one or both of the foot plates (9, 10).

6 Claims, 6 Drawing Sheets

FOOT-PROPELLED WHEELED HOBBY OR SPORT DEVICE

The invention relates to a foot-propelled, wheeled hobby and/or sport device and an auxiliary structure used with it. Favoured devices for spending free time involving physical movement are the various structures rolling on wheels and powered by the legs, of which the most widespread for decades all over the world is the traditional bicycle, which involves sitting on a saddle and making it move via pedals. Besides bicycles, which are of a relatively complex structure and large numerous other, simpler and smaller wheeled hobby devices powered by the legs making it possible to carry out a sport-like hobby activity such roller skates, which are affixed to the user's feet, or the two-wheeled scooter, which has handlebars similar to those of a bicycle and a long, thin plate to which the wheels are fixed in the front and at the rear, and the user stands on the plate with one foot while the other foot powers the scooter. Used to an increasing extent is the so-called skateboard, which has four wheels with a small diameter, and standing on it the user drives it with movements as with the scooter, and on an inclined surface the user may stand on the board with both feet and roll forwards using the body to maintain balance. Finally we mention that there exists a pedal-powered sport or hobby device that has a single spoked wheel of the type used on bicycles the use of which, however, requires—balancing—skills in the individual that very few persons have, so it was not able to become a product that was used to a great extent, not even in a form stabilised with servo motors, which, naturally, increases the manufacturing costs to no small degree.

We would like to remark in connection with the aforementioned skateboard that, although it is an extensively favoured hobby device—it is rather slow and less manoeuvrable, as the resistance of its four small wheels is very large. Besides this there are exception to the skateboard from the point of view of safety, because if the user falls, for example, or gets of the sport device for other reasons, the device becomes free and, for example, on an inclined public road it may roll further on and cause an accident.

The task to be solved with the invention is to provide a foot-propelled, wheeled hobby and/or sport device which makes movement and powering possible similar to that in connection with the skateboard, but which is, however, significantly faster, more manoeuvrable, more easily directed and more favourable from a point of view of safety.

The basis of the invention is the recognition that with the use of a single, for example, spoked wheel with a rubber tyre of a size of those used for bicycles a hobby and/or sport device that is propelled by the feet as when using a scooter may be created the user of which may progress at lower or higher speeds as long as the wheel is surrounded by a yoke in which the wheel axle is fitted in bearings, and the yoke has at least one foot-rest element, favourably one extending on either side, far under the wheel axle, close to the pavement on which the wheel rolls, on which or on one of which the user of the device stands with one leg while propelling the device with the other. Furthermore, we recognised that such a device may be set up with two wheels positioned immediately next to each other displaced in the lateral direction as compared to each other if the wheels are connected in the longitudinal direction, and are fitted in the lateral direction so that they may rotate with respect to each other.

On the basis of this recognition the set objective has been solved with a foot-propelled, wheeled hobby and/or sport device according to the invention that has a foot plate and characteristics of the device include it has a wheel positioned between two side plates the axle of which wheel is fixed to the side plates;

positioned under the wheel axle there are foot plates extending outwards-connected to the side plates;

during the normal use of the device the side plates extend above the knee of the person using the device, who is standing on either one or both of the foot plates. In the interest of increasing the stability of the device it is practical if the side plates are fixed together as a yoke via a connection rib or ribs running along their edges.

According to another construction example the ends of the wheel axle are fixed into the thickened plate parts of the side plates, fitted into them.

It is favourable, furthermore, if the foot plates are positioned at a maximum distance from the axle of the wheel ensuring perfect function of the device practically at a distance from ground level in the operating position of the device that makes function possible, advantageously at the same level.

Characteristic of another embodiment of the device is that the side plates are circular plates of a form and size that essentially conforms to that of the form of the wheel, and the curved, convex, as seen from the outside, connection rib runs without interruption along the edges of the side plates—except for an opening allowing the wheel rim to protrude.

According to a further invention criterion the side plates are formed so that they only partly cover from the side of the wheel, advantageously in such a way that in the vicinity of the wheel axle their width is the smallest, and from this range their width increases downwards and upwards.

A construction form may be advantageous if it has a bearing housing surrounding the axle and a wheel rim with a rubber pneumatic tyre, which wheel is connected to the bearing housing by spokes; furthermore, if the device has handlebars that are directly or indirectly connected to the side plates.

According to another invention criterion at the height of the shins of the person using the device there is a supporting plate fixed to each of the side plates parallel to the axle.

Another foot-propelled, wheeled hobby and/or sport device with a foot plate also forms the subject of the invention, and characteristics of this device include it has two parallel wheels separated by a distance, positioned displaced from one another in side view, which are connected to each other by a connection element that prevents movement in the longitudinal direction with respect to one another, but permits rotation as compared to one another;

the bearing housing of the axles of the wheels protrude from the plane of the wheels, and supporters are fixed to these protruding bearing housing parts;

foot plates are fixed to the lower parts of the supporters, and above these there are side plates fixed to the supporters extending above the knees of the user while the device is in use. It is practical if the device has an upside-down V shaped, from side view, Z shaped, from above, connection element with displaced curved legs connected to one another with a connection rib falling in the plane of the wheels and, in a practical case, horizontal from above, from the lower end of each of the legs there is a vertical pin protruding downwards; and these pins fit into bearings fixed into the part of the bearings of the wheel axles that protrude inwards from the wheel plane. It is advantageous, furthermore, if the device has curved supporters which extend above to the upper range of the wheels. According to another invention criterion the wheels are displaced with respect to one another to an extent that the contour line of the one wheel is positioned in the vicinity of the axle of the other wheel, in a practical case with a separation equivalent to 1-5% of the diameter of the wheel. It is practical if the wheels are braced to each other with one or more springs—so that they may rotate from each other contrary to the spring force; and the device has blocks preventing the wheels that have been pushed back into their basic position by the spring or springs from touching one another. In this case it is advantageous if the springs are positioned on the lower and upper part of the device, in a practical case the upper edges of the side plates are connected with two springs, and one spring is inserted between the foot plates. It may also be a good feature if there are blocks on the inner side of the lower ends of the connection element legs; and also if there are blocks on the outer sides of the bearings receiving the vertical pins.

The subject of the invention also relates to an auxiliary structure to be used with the above hobby and/or sport device for the reduction of the friction between the person using the device and the side plates, the essence of which is that there is a cart-like structure that may be fixed to the knee of the person using the device with a releasable connection, into which there are protruding rollers embedded in the side turned towards the side plate and the side opposite this side is a surface curved to match the shape of the knee. A characteristic of an embodiment of the auxiliary structure is that if in side view the cart-like structure has a rectangular—in a given case with rounded corners—base, in the corner vicinities of which there are hollows formed in the plane surface and into these hollows the axles of the rollers are fitted, and the opposite side is curved in shape. It is practical if the rollers protrude 1-3 mm out of the, preferably, plane surface turned towards the side plate. It may also be advantageous if the cart-like structure has brace(s) consisting of hook and loop brace-parts.

In the following the invention will be presented in detail on the basis of the attached drawings, which contain advantageous construction examples of the foot-propelled, wheeled hobby and/or sport device and some structural part-solutions. In the drawings

Figure 1:
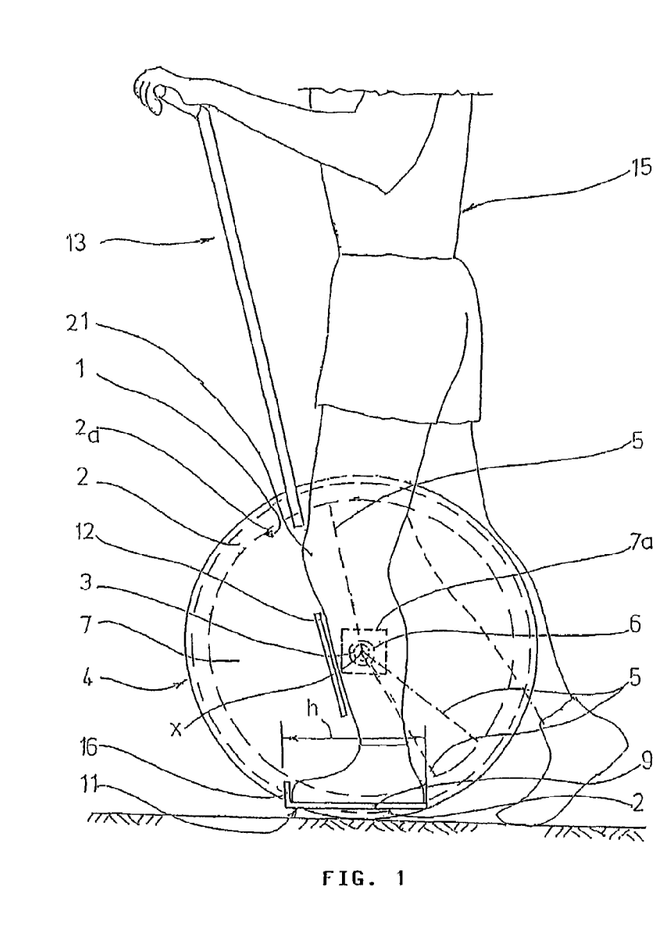
FIG. 1 shows a construction form of the device in side view with the person using and standing on it.
Figure 2:
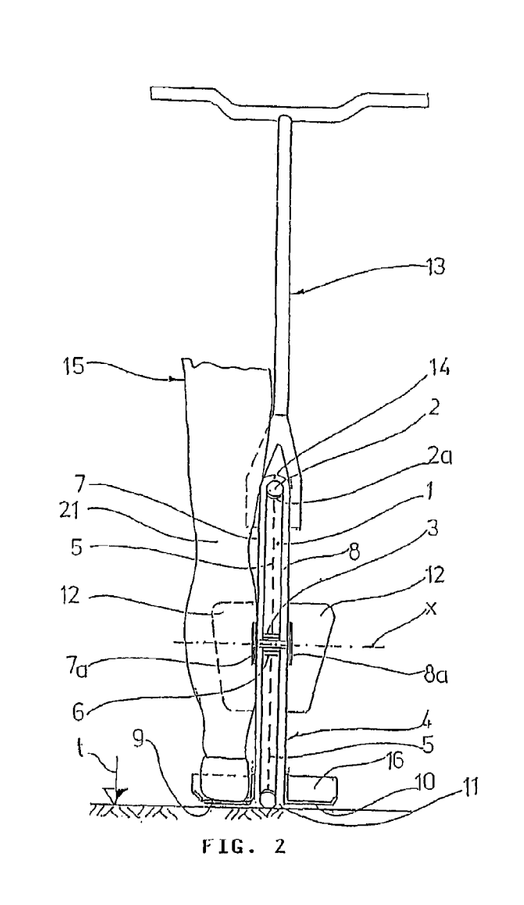
FIG. 2 shows the cross section of the device according to FIG. 1 taken through the wheel axle.

The whole hobby and/or sport device seen on FIGS. 1 and 2 has a wheel with reference number 1, which, for example, is the same as a traditional spoked bicycle wheel, or may be of a construction similar to that. In accordance with this it has a central axle 3 and a bearing housing 6 surrounding this, which is connected by spokes 5 marked with dotted lines to a wheel rim 2a, which has—in a way known in itself—a pneumatic rubber tyre 2 fitted to it. (For the purpose of clarity we have only drawn in a few spokes 5 in FIG. 1.) The geometric axis of rotation of the wheel 1 has been marked with the reference letter x.

Figures 3, 4:
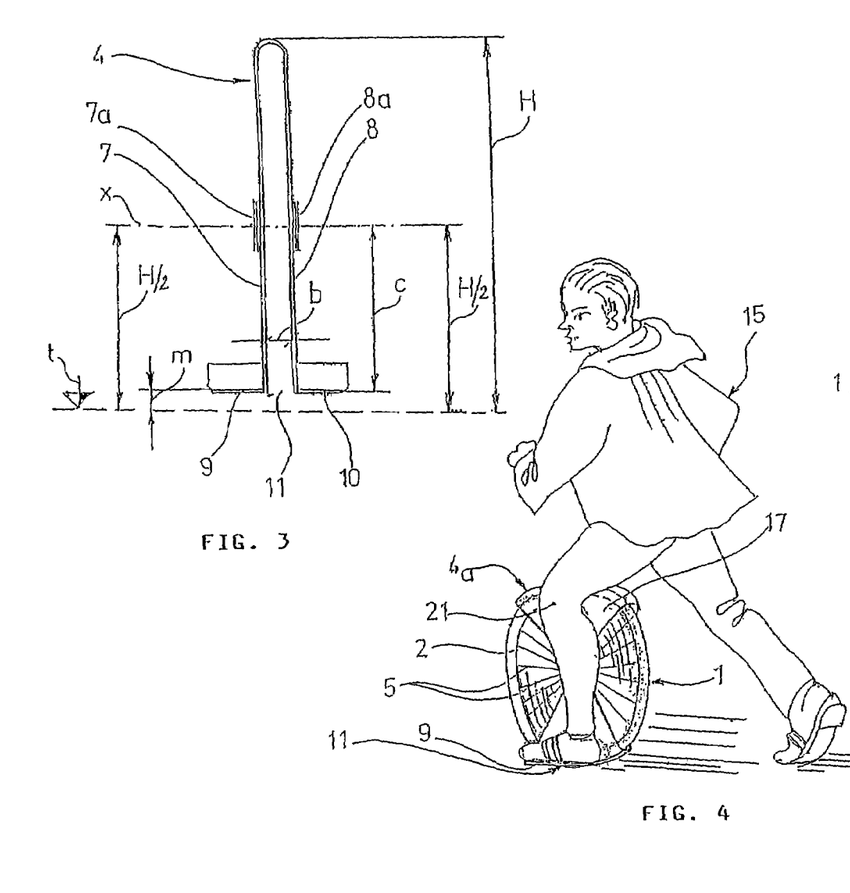
FIG. 3 separately shows the yoke forming a part of the device in sketched cross section.
FIG. 4 shows another construction form of the device according to FIG. 1 together with a person using the device who is standing on the device with his/her left foot and propelling it with his/her right.

In the sense of the invention the device has a yoke 4 that carries out the transfer of the load of the mass of the person using the device 15 within the circumference of the wheel 1 far under the geometric axis of rotation x, which from the point of view of its cross section (FIG. 2) is an upside-down U shaped, box-like element with its legs pointing downwards, which in the case of this construction example has essentially round, when seen from side view, plane side plates 7, 8. Here the side plates 7, 8 are only "essentially" round, because in the middle of their lower end part a sector-shaped part with length h is missing (FIG. 1), which, as can be seen in FIG. 3, has a height m. As the side plates 7, 8 are connected to each other by a curved connection rib 14, protruding when seen from the outside, which extends along the majority of the circumference of the side plates 7, 8—in other words it extends to the two end points of the "cut out" sector-shaped part we have already mentioned—as rigid, box-like yoke 4 is formed on the lower part of which there is an opening 11 (see also FIGS. 1 and 2), which has length h, width b, and the edge of which lies at a height m above the ground level t—pavement—when the person 15 shown on FIGS. 1 and 2 uses the device in the proper manner. If the total height of the device above the ground level t is H, the geometric axis of rotation x of the wheel 1 is positioned at a height H/2 above the ground level t. The axle 3 of the wheel 1 shown in FIGS. 1 and 2 is fixed rigidly into the thickened plate parts 7a, 8a of the side plates 7, 8 by its ends, and it is practical if these thickened plate parts 7a, 8a are so positioned that the geometric axis of rotation x goes through their centre points. The axle 2—in the usual way—may be constructed from steel, and the yoke 4 from glass fibre polyester; this material, in the case that its thickness is sufficiently dimensioned, may provide a secure fixation for the axle 3.

The lower foot plates 9, 10 protruding outwards on both side are connected directly to the side plates 7, 8, in a practical case formed as one element with the yoke 4, in other words these are plates that provide support for the one or the other foot, the person using the device 15 stands—leans on—with one foot on one of them, while the other foot propels the device with intermittent kicking movements from ground level t similar to those when using a scooter. The supported foot and the propelling foot may even swap roles while in motion. As it can be seen in FIG. 1 from side view the foot plates 9, 10 are positioned in the range within the circumference of the wheel 1, and as far as possible under the geometric axis of rotation x. The height of the side plates 7, 8, in other words the yoke 4 is selected so that its upper edge extends above the knees 21 of the person using the device 15, when he/she is using the device in the proper manner (FIG. 1).

The stability of the device during use is greater, the greater the distance c is, in other words the foot plates 9, 10 are positioned as deeply as possible under the axis of rotation x, that is the distance m between the ground level t, the surface of the pneumatic rubber tyre 2 rolling on it, and the foot plates 9, 10; so via the yoke 4 the person using the device 15 load the axle 3 of the wheel 1 under the geometric axis of rotation x, close to the most external circumference line of the wheel 1, almost touching the ground level t. We would like to mention that it is most practical if the foot plates 9, 10 start out from the longitudinal edges of the opening 11, in other words those perpendicular to the geometric axis of rotation x, and are formed as the outward bent continuations of the side plates 7, 8, but, naturally, they may be positioned higher.

We mention here that the device according to FIGS. 1-3 has a yoke 4 basically for considerations of stability, the device has side plates 7, 8 and foot plates 9, 10, which are of determinant significance from the point of view of the operation of the device. As the composite action between the foot of the person using the device 15 eccentrically loading the device and the wheel 1 is produced by the friction force occurring between the one of the side plates 7, 8 and the shin as a result of the horizontal reaction force of the torque created by the eccentric load force during the swapped (or one sided) supporting-propelling cycles.

The yoke 4 may also be supplemented with handlebars 13 of a type like those used on bicycles with a lower forked end, which also serves better stability in the plane of motion and the counterbalancing of the eccentric loading, and it makes the use of the device safer, so requiring less skill, so it is only required primarily for beginners while they are learning. The same thing can also be said of the supporting plates 12 positioned parallel to the geometric axis of rotation, to which the shin of the supporting foot can be pushed up against during motion. The faceplates 16 of the foot plates 9, 10 are to prevent the feet from slipping forwards, however, these are not required by an experienced user either.

Figure 5:
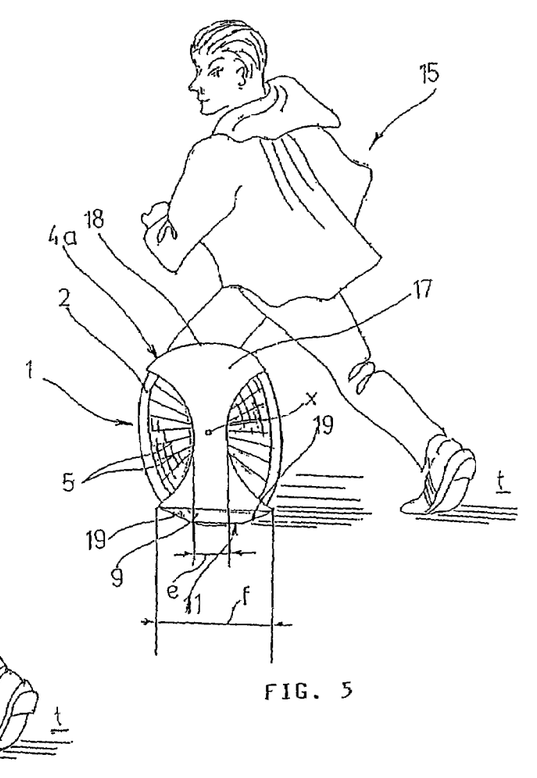
FIG. 5 shows the phase of the use of the device according to FIG. 4 when the person using it is standing on it with his/her right foot and propelling it with his/her left.

The yoke 4 presented in detail above apart from the opening 11 completely encloses the wheel 1, however, it is not essential to have it. Partly to reduce the mass of the device and partly for the purpose of saving on material the application of the yoke 4a that can be seen in FIGS. 4 and 5 may be advantageous, the side plates 17 of which yoke 4a are formed by cutting out a deep section from the side plates 7, 8 according to FIGS. 1-3. In this way the side plates have a minimum width e in the line of the geometric axis of rotation x and above and below—in projection—a maximum width f and are convex seen from above and below and concave seen from the two sides, these elements are fixed to each other with a connection rib 18 above and two short connection ribs 19 below. The width e should, naturally, be selected so that there is sufficient space for the friction connection between the shin and the side plates 17.

Figure 6:
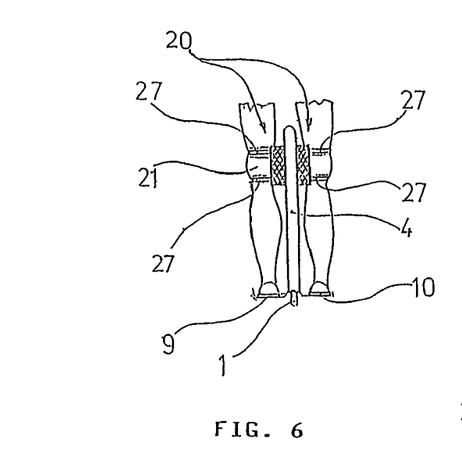
FIG. 6 shows an auxiliary structure making the use of the device easier in sketched rear view.
Figure 7:
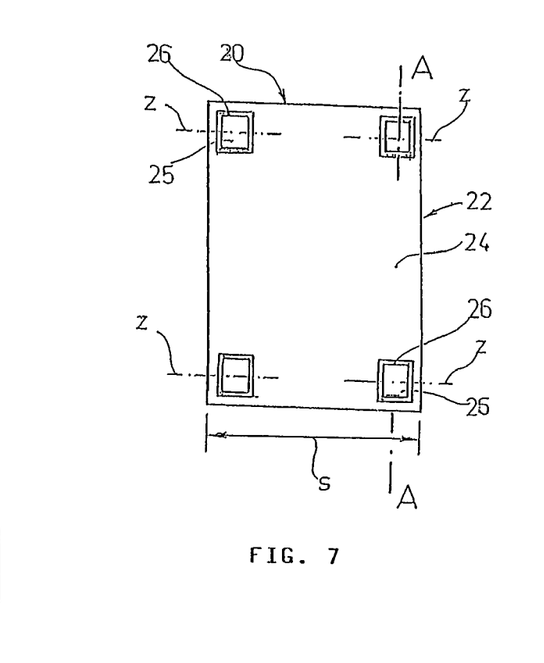
FIG. 7 shows the side view of an element of the auxiliary structure according to FIG. 6.
Figure 8:
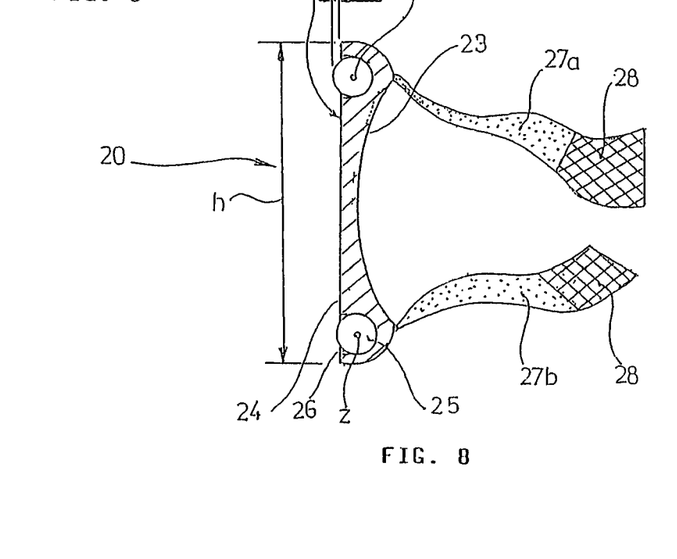
FIG. 8 shows the cross section taken along the line A-A marked on FIG. 7.
Figure 9:
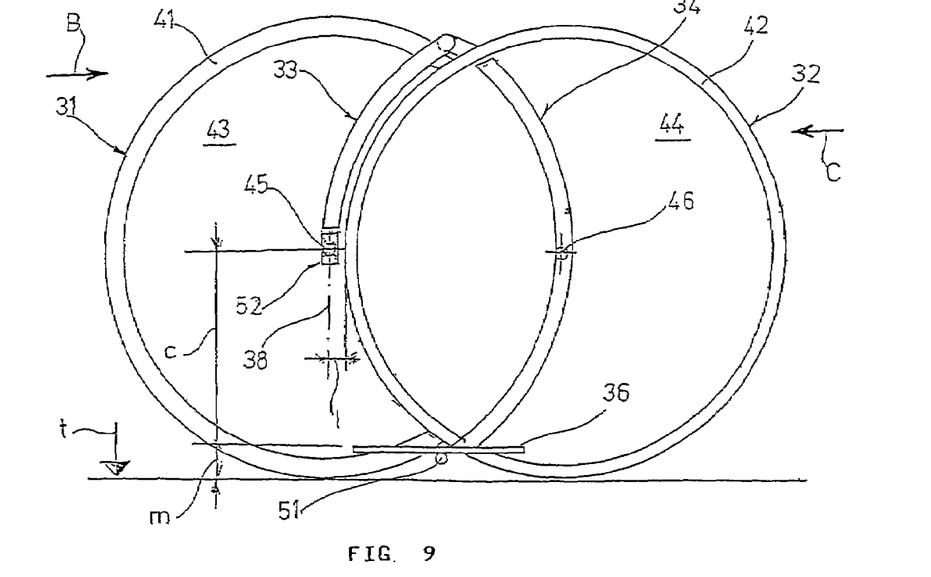
FIG. 9 shows a further construction form of the hobby and/or sport device in side view, without side plates.

The use of the hobby and/or sport device according to FIGS. 1-5 takes place in the following way:

The person using the device 15—as we have already mentioned—propels the device with movements similar to those made when using a scooter. The one foot—the left one according to FIG. 4—loads the device eccentrically standing on the foot plate 9 and the fight foot propels; kicking away from the ground level t this foot then stands on the right hand foot plate 10 (FIG. 2) and then the left foot carries out the propelling movement, as we can see on FIG. 5. So progression takes place with alternating standing on the foot plates 9, 10 and kicking away, but naturally it is not compulsory to kick away and stand always with alternate feet, several kicks may be made by the one foot and then on the other side. The torsional force made as a consequence of the propelling is counterbalanced by the force of the ankle of the person using the device 15 exerted in the opposite direction. After reaching a greater speed it becomes possible for the person using the device 15 to stand on both foot plates 9, 10 continuously and move forwards along a sine wave line known from the movement of persons using skateboards. At this time the force needed to move forwards can be attained with the alternate left and right movement of the hips—with steering movements—and the twisting of the hips, in other words actual steering motions involving hip thrusts. If the device is also fitted with handlebars 13 (FIGS. 1 and 2), the steering movements and the maintenance of the wheel 1 in a vertical plane is ensured by the handlebars 13 and the connection rod that forms a part of it. The handlebars 13 provide the opportunity of fitting brakes and the ability to brake the device during motion as well, which may increase stability in the plane of the wheel 1. The brake may be a block brake as used on normal bicycles, which may be fitted in front of the upper section of the yoke 4 that accepts the wheel 1. The operating cable may be led up to the handbrake grip belonging to the handlebars 13, which may be held freely in the hand. Especially in the period of learning to use the device the use of an auxiliary structure—sliding insert—marked with reference number 20 as a whole can be practical, which is for the purpose of reducing friction occurring while propelling the device between the yoke 4 and the knees 21 of the person 15 using the device. The auxiliary structure 20 has a rectangle-shaped, favourably rectangular-shaped base 22 the inner surface 23 of which touching the knee 21 has a concave curve looking at it from the outside, and its outer surface 24 touching the yoke 4 while the device is used is a straight, plane surface. In the four corners of the base 22—where it is the widest as it is shown in FIG. 8—there are hollows 26 in the plane surface 22 in which there are rollers 25 which can be rotated around the z axles of a fixed position so that their surface protrudes from the plane of the surface 24 by a k distance, by a few, practically 1-2 mm-s. For example the h length of the base 2 can be 10-12 cm, and its s width can be 4-6 cm. AS a result of the construction described above the auxiliary structure 20 is a coach like construction, which can roll on the other surface of the yoke 4, and which can be attached to the user's knees 21 with a releasable connection, for example with hook and loop 28 braces 27. As it can be seen in FIGS. 6 and 8 two brace parts 27a, 27b are fixed to each auxiliary structure in the area at the ends of the shorter edges of the ase 22, which are taken round the knee 21 and attached to each other with their hook and loop 28, and so the braces 27 shown in FIG. 6 are created.

Figure 10:
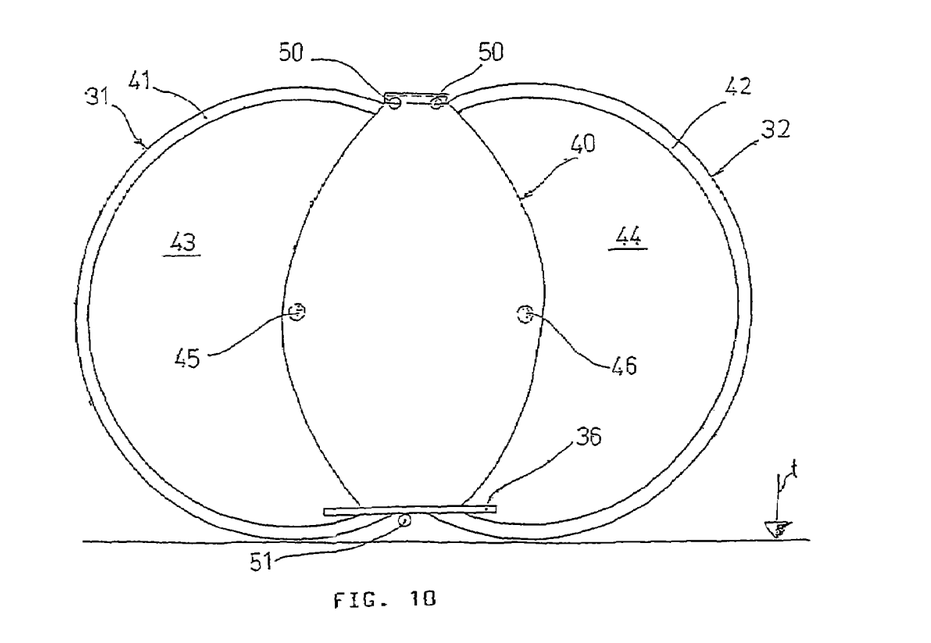
FIG. 10 shows the device according to FIG. 9 fitted with side plates.
Figure 11:
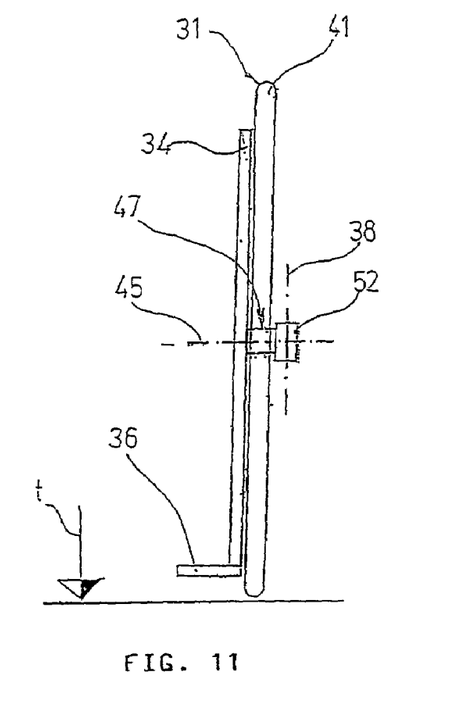
FIG. 11 shows the view seen from the direction B marked on FIG. 9.
Figure 12:
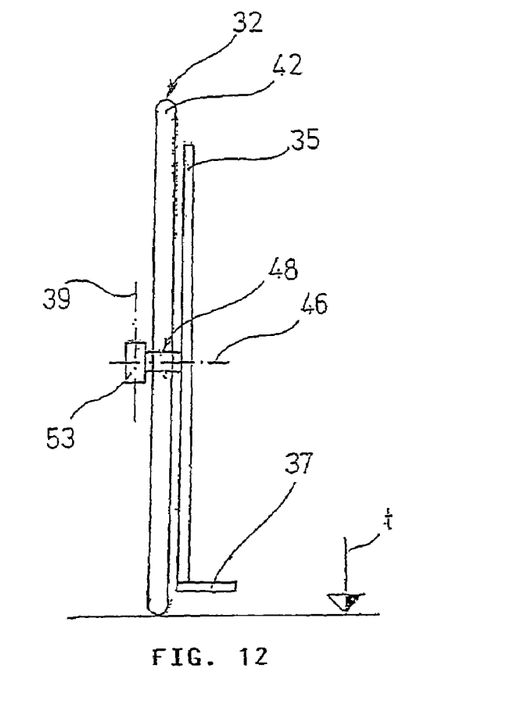
FIG. 12 shows the view seen from the direction C marked on FIG. 9.
Figure 16:
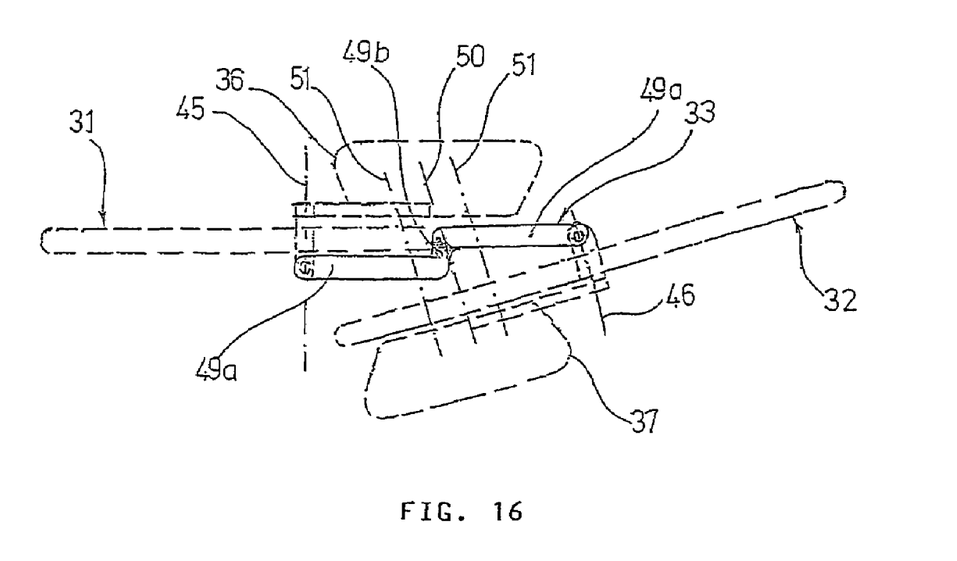
FIG. 16 shows the plan view of the connection element, also showing the wheel-rotation possibility with dotted lines.

A further construction of the hobby and/or sport device is shown in FIGS. 9-16. This device has two wheels 31, 32 of the same diameter situated positioned immediately next to each other displaced in the lateral direction as compared to each other, overlapping each other nearly to the axles 45, 46; the outside surface of the tyres 41, 42 is positioned at a minimum distance 1—of about 1-5% of the diameter of the wheel—from the axle of the other wheel. The two wheels 31, 32 are connected on the one part by a connection element 33 according to FIGS. 14-16, made of stiff pipe for example, which has an upside down V shape in the lateral direction, with curved legs 49a, which are situated displaced in the lateral direction as compared to each other in plan view, as shown in FIG. 16, connected with a short, horizontal upper rib 49b, so in plan view the connection 33 element is Z-shaped, and pins 38, 39 protrude downwards from the upper end of its legs 49a, and towards the lower end of the legs 49a there are blocks 54, 55 protruding inwards; the role of these pins and blocks will be described later. The connection element 33 encases the wheels 31, 32 with a distance of a few mm-s from the tyres 41, 42, its legs 49a are in the plane of a wheel 31, 32 each, and they can be as wide as the tyre. It must be pointed out that in this case the wheels 31, 32 are bicycle-type wheels, but here the wheel rim 41a is not connected to the bearing housings 47, 48 by spokes, but by solid, stiff wheel web-plates 43, 44 (FIG. 10).

The above bearing housings 47, 48 should be practically constructed with sleeve pipes the width and bearing capacity of which is bigger than that of the usual bicycle bearings, and on the two sides it protrudes from the plane of the wheels 31, 32 over the side surfaces of the pneumatic rubber tyres 41, 42 seen in a vertical plan. It can be seen well in FIGS. 9, 11 and 12 that a stiff curved supporter 34, 35 is connected to each protruding end of the bearing housings 47, 48 made of solid (e.g.: metal or plastic) plate or rod, and on the one part its function is to make it possible to fix the side plates 40 (in FIG. 10 only one of the side plates is shown for better understanding) and on the other part a foot plate is fixed to their upper ends 36, 37 each at a minimum m height above the ground surface t, that is in this case again the distance c under the axles 45, 46 to the foot plates 36, 37 should practically be as big as possible.

Figure 13:
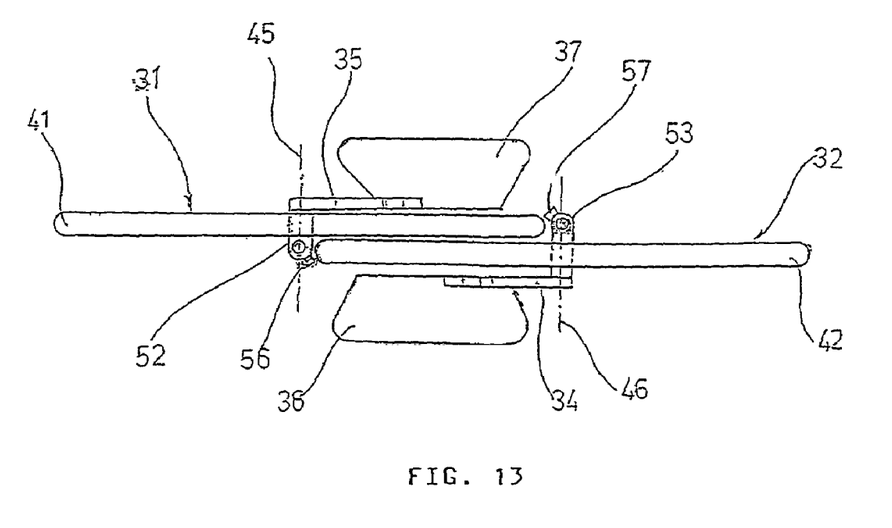
FIG. 13 shows the device according to FIG. 9 in plan view, without the connection element that connections the wheels.
Figure 14:
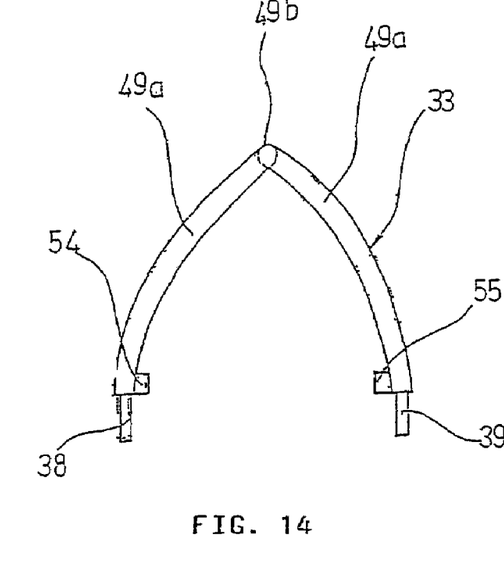
FIG. 14 shows the side view of the connection element.
Figure 15:
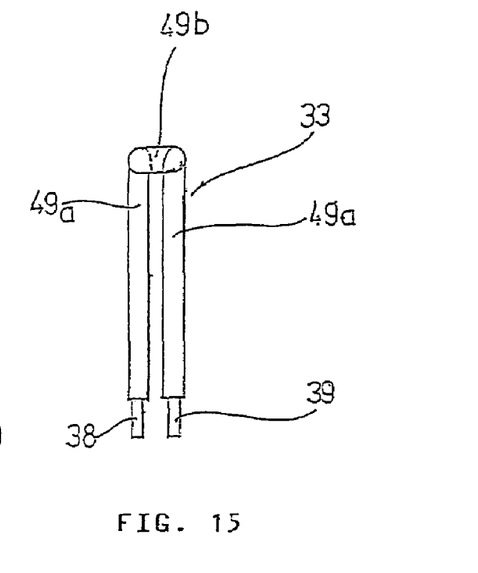
FIG. 15 shows the front view of the connection element.

A bearing 52, 53 to admit the vertical axles 38, 39 of the connection element 33, protruding downwards is fixed to each end of the bearing housings 47, 48—sleeve pipes—protruding inwards. So when the wheels 31, 32 are placed next to each other as shown in FIG. 13, and the connection element 33, which is Z-shaped in top plane, is adjusted to the bearings 52, 53 with its axles 38, 39, a connection is created between the wheels 31, 32, where their longitudinal position displaced as compared to each other in the lateral direction is fixed, and so the wheels can be propelled closely next to each other, at the same time—as it was shown in FIG. 16—they can be rotated in the opposite direction as compared to each other, so it is easy to steer the device and there is a possibility to change directions. However, while the user of the device can easily turn the wheel 31, 2 outwards by pressing the user's feet in the right direction, turning it back from the position shown in FIG. 16 cannot be solved comfortably only with the force expressed by the feet, so according to the invention a spring is built in at the bottom 51 connecting the foot plates 36, 37, and two springs 50 are built in at the top to connect the plum stone shaped (FIG. 10) side plates 40 overlapping the curved supporters 34, 35—their upper edges—, to make it possible and easier to turn back the wheels 31, 32 in the basic position shown in FIG. 13. In order to stop the two wheels bracing up against each other as a result of the force of the springs 50, 51, the above blocks 56, 57 and 54, 55 are built in; blocks 56 and 54 and blocks 57 and 55 are adjusted to each other and they prevent the wheels 31, 32 from bracing up against each other.

The curved supporters 34, 35, the foot plates 36, 37 the bearing housings 47, 48 and the vertical axles 38, 39 of the device—according to the invention, described above, form a rigid unit on which the wheels can rotate 31, 32.

The hobby and/or sport device according to FIGS. 9-16 is used so that the user propels the device with movements similar to those when using a scooter, and so the user can turn with the device for the purpose of balancing or changing directions; turning is made possible by moving the foot plates 36, 37 from the ankles. By turning the front wheel left the device turns left, and by turning the back wheel left the device turns right. The basic position providing a straight run—as mentioned above—is ensured by pulling strings 50, 51. Standing on the foot plates 36, 37 the user eccentrically loads the device. As a result of eccentric loading a horizontal reaction force is generated on the knees, which ensures composite action between the device and the user's feet; the supporting force is taken on and passed onto the device by the side plates 40. The use of the auxiliary structure 20—a small coach-like structure—according to FIGS. 6-8, fixed to the knee as a supporting point is mainly recommended during the period of learning how to use the hobby and/or sport device. The position of the auxiliary structures 20 during use is shown in FIG. 6, where the structural elements described above are marked with the reference numbers already used. For the sake of simplicity the use of the auxiliary structures 20 is only described with respect to the device shown in FIGS. 1-5, but obviously they can be used in the same way in connection with the device shown in FIGS. 9-16. The person using the device stands on the foot plates 9, 10 with both feet in the position shown in FIG. 6, and supporting against the yoke 4 with the auxiliary structures 20 attached to the user's knees 21 with two braces 27 each, the user moves rolling on the wheel 1. The support between the yoke 4 and the knees 21 provided by the low friction—rolling—intermediate auxiliary structure 20 makes it possible for the user to place the centre of gravity of the user's body forward or to the rear to a smaller extent, which makes balancing easier and increases stability while moving.

The advantage of the invention is that the resistance of the device is low—first of all due to the large wheel diameter—, it is significantly lower than that of other similar sport and/or hobby devices such as skateboards, and it can be easily steered with small ankle movements. Due to the fact that when the user steps off the vehicle, it tips over immediately, stops rolling and stays lying on the ground, it represents a significantly lower danger of accident than skateboards that run loose and roll on on their own in this case. The advantage of the auxiliary structure is that it makes it easier to learn to use the vehicle.

Obviously the invention is not restricted to the construction example of the device described above, but it can be constructed in several ways within the sphere of protection defined by the claims.

The invention claimed is:

1. A sport device that is propelled by kicking away from a solid surface, comprising:
    a wheel (1) that can be rotated around an axle (3);
    foot plates (9, 10) extending outwards under the level of said axle (3) by said wheel (1) having two side plates (7, 8) fixed to the axle (3) of the wheel (1), and the foot plates (9, 10) rigidly fixed to a lower end range of the side plates (7, 8), the lower end range of the side plates being formed so that the side plates (7, 8) extend upwards; and
    a first supporting plate (12) and a second supporting plate (12) that are respectively coupled to each of the side plates (7, 8), the first and second supporting plates being parallel to the axle (3) and extending lateral from each of the side plates.

2. The sport device according to claim 1 wherein the side plates (7, 8) are fixed together as a yoke (4, 4a) via a connection rib (14) or ribs (18, 19) running along their edges.

3. The sport device according to claim 1 or 2 wherein the ends of the wheel (1) and axle (3) are fixed into thickened plate parts (7a, 8a) of the side plates (7, 8).

4. The sport device according to claim 3 wherein the foot plates (9, 10) are positioned at a predetermined distance (c)

from the axle (3) of the wheel (1) ensuring operation of the device at a distance (m) from ground level (t) in an operating position of the device.

5. The sport device according to claim 4 wherein the side plates (7, 8) are circular plates of a form and size that essentially conforms to that of the form of the wheel, and a curved, convex, as seen from the outside, connection rib (14) runs without interruption along the edges of the side plates (7, 8), except for an opening (11) allowing the wheel rim (2a) to protrude.

6. The sport device according to claim 4 wherein the side plates (7, 8) are formed so that they only partly cover from the side of the wheel (1), advantageously in such a way that in the vicinity of the wheel (1) axle (3) their width is the smallest, and from this range their width increases downwards and upwards.

\* \* \* \* \*